March 24, 1936.  F. B. THOMAS  2,035,029
SPRING GAUGE
Filed Feb. 2, 1935
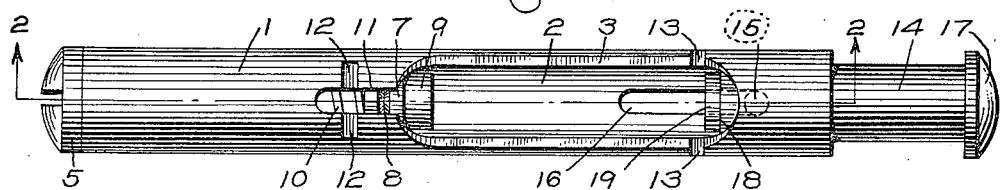
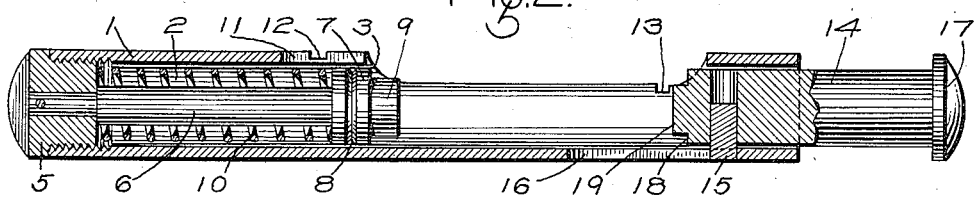
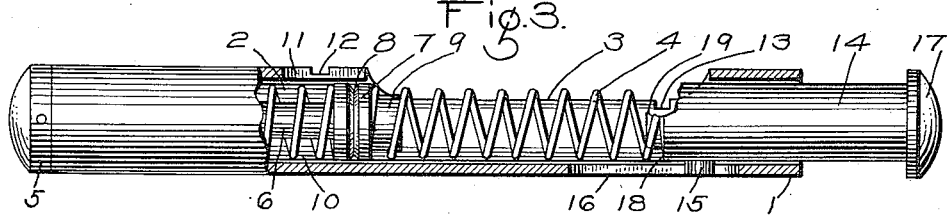
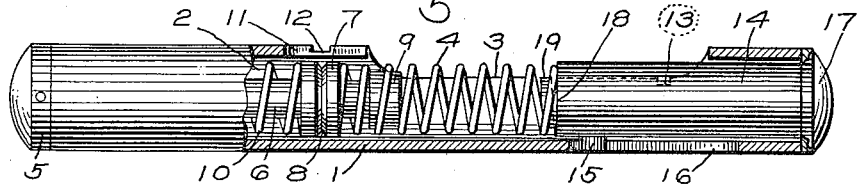
INVENTOR
FRANK B. THOMAS
BY  Wm. M. Cady
ATTORNEY Patented Mar. 24, 1936

2,035,029

UNITED STATES PATENT OFFICE 2,035,029

SPRING GAUGE

Frank B. Thomas, Irwin, Pa., assignor to The Westinghouse Air Brake Company, Wilmerding, Pa., a corporation of Pennsylvania Application February 2, 1935, Serial No. 4,594

2 Claims. (Cl. 73—51)

This invention relates to gauges, and more particularly to a gauge for verifying springs, especially coil springs such as the graduating springs of the "K" type of triple valve devices employed in fluid pressure brake equipment.

The graduating spring of a "K" triple valve device acts, through the medium of a slidable plunger to prevent the triple valve piston and associated slide valves from accidentally moving to emergency position when a reduction in brake pipe pressure is effected at a service rate. Since all triple valve devices of this type are constructed substantially alike it is essential that the graduating springs be substantially alike as to their free height and their ability to prevent the accidental movement of the triple valve parts to emergency position.

The principal object of the invention is to provide an improved gauge for verifying springs as to their free height and their resisting force when compressed a certain amount.

Other objects and advantages will appear in the following more detailed description of the invention.

In the accompanying drawing Fig. 1 is a side elevational view of a gauge embodying the invention; Fig. 2 is a longitudinal sectional view of the gauge taken on the line 2—2 of Fig. 1; Fig. 3 is a view partly in section and partly in elevation illustrating the method of gauging the free height of a spring, and Fig. 4 is a view similar to that of Fig. 3 illustrating the method of verifying the resistive force of the spring.

As shown the gauge may comprise a casing 1 which is preferably of tubular form having a central bore 2 and which is provided with an elongated opening 3 through which a spring 4 is adapted to be placed in gauging position within the bore without having to compress the spring.

One end of the bore 2 is closed by a plug 5 which has screw-threaded connection with the casing within the bore. Secured to the plug 5 and extending inwardly therefrom centrally of the bore is a guide bar 6 on which there is slidably mounted an indicating element 7 which, in the present embodiment of the invention, is of circular form and which is provided with a V-shaped indicating groove 8 which is preferably continuous around and open to the periphery of the indicating element. The inner end of the guide bar is provided with an enlargement or head 9 which is adapted to engage and limit movement of the indicating element in the direction toward the right hand.

Interposed between and engaging the plug 5 and the indicating element 7 and encircling the guide bar 6 is a coil spring 10 which normally maintains the indicating element in engagement with the head 9 of the guide bar.

The opening 3, rearwardly of the portion through which the spring 4 is adapted to be inserted, is in the form of a slot 11 through which the indicating groove 8 of the indicating element is constantly in view. The edge portions of the casing 1 which define the slot 11 are provided with exterior indicating grooves or notches 12. These notches 12, as will hereinafter more fully appear, are so arranged, with relation to the length of the casing, that they will, by comparison with the indicating groove 8 of the indicating element 7, indicate whether or not the resistive force of the spring being verified meets a desired or chosen standard.

Adjacent the right hand end of the opening 3 the edge portions of the casing which define said opening are provided with exterior indicating notches 13 which are so located with relation to the length of the casing as to indicate whether or not the free height of the spring being verified meets a desired or chosen standard.

Slidably mounted in the right hand end of the casing 1 is a plunger 14 which is held against separation from the casing by means of a pin 15 which extends into a slot 16 provided in the casing.

The outer end of the plunger is provided with a head 17 which is adapted to engage the adjacent end of the casing to limit the movement of the plunger when it is forced inwardly to compress a spring. The inner end of the plunger is provided with an annular spring seat 18 which encircles an inwardly extending spring guide projection 19.

It will be noted that when the plunger is in its extreme outer position as shown in Figs. 2 and 3, the end surface of the projection will be positioned to the right of the notches 13 so that the plunger will not interfere with the spring 4 as it is placed in position in the bore of the casing.

In operation, a spring 4 which is to be gauged is placed in the bore of the casing and the left hand end thereof is caused to contact with the face of the indicating element 7 as shown in Fig. 3. The plunger 14 is then moved inwardly until the face of the spring seat 18 thereof just contacts with the free end of the spring and if the face of the spring seat is in transverse alignment with any part of the notches 13, the person verifying the spring will know that it is of the proper length. Slight variations in the lengths of springs are permissible and the sides of the slots 13 will indicate the permissible variations.

After it has been ascertained that the spring 4 is of the correct length, the plunger 14 is forced inwardly until the head 17 thereof engages and comes to a stop against the right hand end of the casing, as shown in Fig. 4. The plunger as it is thus being moved, compresses the spring 4 and at the same time causes the indicating element 7 to move toward the left hand end of the casing against the opposing force of the spring 10. If, when the plunger head 17 is in engagement with the end of the casing, the force of the compressed spring 4 is such that it will cause the indicating element to so move that the bottom of the indicating groove 8 is in transverse alignment with any portion of the space between the sides of the grooves 12, the person verifying the spring will know that the resistive force of the spring is correct. The grooves 12 are of such a width as to indicate the range of permissible variations in the force of the springs 4 when they are compressed.

The gauge is especially adapted for use in verifying graduating springs to be employed in triple valve devices and in the present embodiment of the invention the spring 10 is a master graduating spring which has been found to function accurately. This spring is initially compressed and normally maintains the indicating element in engagement with the head, the spring being compressed the same amount as the spring is compressed in a triple valve device. The positioning of the indicating element as well as its movement corresponds with the positioning and movement to service position of the graduated release stop of a triple valve device. It will thus be seen that the arrangement and operation of the master spring 10 and indicating element 7 will simulate, as far as possible, the arrangement and operation of the graduating spring and graduating stop of a triple valve device. In this connection it will be understood that the face of the spring seat 18 when the plunger 14 is in its innermost position as shown in Fig. 4 acts on the spring 4 to simulate the action of the triple valve piston to compress the graduating spring.

While one illustrative embodiment of the invention has been described in detail, it is not my intention to limit its scope to that embodiment or otherwise than by the scope of the appended claims.

Having now described my invention, what I claim as new and desire to secure by Letters Patent, is:

1. In a device for gauging springs, in combination, a casing in which the spring to be gauged is adapted to be placed and having an indicator notch for use in verifying the force of the spring when compressed and having a notch for use in verifying the free height of the spring, a combined spring seat and indicator element movably mounted in said casing, one end of the spring to be gauged being adapted to seat on the spring seat, indicating means on said indicating device visible from the exterior of the casing for comparison with the first mentioned indicator notch, yieldable resistance means normally maintaining said indicator element in a position in which the indicating means is spaced away from the first mentioned indicator notch and being adapted to yield to the force of the spring to be gauged when the spring to be gauged is compressed, a plunger slidably mounted in the casing and operative to compress the spring to be gauged, said plunger having a face for engagement with the other end of the spring and being visible from the exterior of the casing for comparison with the second mentioned indicator notch for verifying the free height of the spring to be gauged.

2. In a device for gauging springs, in combination, a casing in which the spring to be gauged is adapted to be placed and having an indicator notch for use in verifying the force of the spring when compressed and having a notch for use in verifying the free height of the spring, a combined spring seat and indicator element movably mounted in said casing, one end of the spring to be gauged being adapted to seat on the spring seat, indicating means on said indicating device visible from the exterior of the casing for comparison with the first mentioned indicator notch, yieldable resistance means normally maintaining said indicator element in a position in which the indicating means is spaced away from the first mentioned indicator notch and being adapted to yield to the force of the spring to be gauged when the spring to be gauged is compressed, a plunger slidably mounted in the casing and movable for compressing the spring to be gauged, means for limiting the spring compressing travel of the plunger to the travel of a plunger adapted to cooperate with the spring in a mechanism, said plunger having a face for engagement with the other end of the spring and being visible from the exterior of the casing for comparison with the second mentioned indicator notch for verifying the free height of the spring to be gauged.

FRANK B. THOMAS.